United States Patent
Richter

(10) Patent No.: US 6,749,160 B1
(45) Date of Patent: Jun. 15, 2004

(54) SUCTION DISC MOUNTING ARRANGEMENT

(76) Inventor: Herbert Richter, Drosselweg 8, 75331 Engelbrand (DE)

( * ) Notice: Subject to any disclaimer, the term of this patent is extended or adjusted under 35 U.S.C. 154(b) by 0 days.

(21) Appl. No.: 10/434,662

(22) Filed: May 8, 2003

(30) Foreign Application Priority Data

Mar. 12, 2003 (DE) .......................................... 103 11 112

(51) Int. Cl.[7] .............................................. A45D 42/14
(52) U.S. Cl. .............................. 248/206.2; 248/309.3; 248/500
(58) Field of Search .......................... 248/205.8, 205.9, 248/205.5, 205.7, 206.2, 363, 500, 309.3

(56) References Cited

U.S. PATENT DOCUMENTS

| | | | | |
|---|---|---|---|---|
| 3,020,017 A | * | 2/1962 | Watson | 248/205.8 |
| 3,082,988 A | * | 3/1963 | Holden | 248/205.8 |
| 4,580,751 A | * | 4/1986 | Panzer | 248/205.8 |
| 4,813,640 A | * | 3/1989 | Perentin | 248/205.8 |
| 6,308,923 B1 | * | 10/2001 | Howard | 248/205.5 |
| 6,550,735 B1 | * | 4/2003 | Zheng | 248/304 |

* cited by examiner

*Primary Examiner*—Ramon O Ramirez
(74) *Attorney, Agent, or Firm*—Klaus J. Bach

(57) ABSTRACT

In a suction disc mounting arrangement for supporting objects on smooth surfaces wherein a suction disc is supported in a housing cavity in which also an operating element is movably disposed and connected to the suction disc and operating means are supported on the operating element for pulling the suction disc into the housing cavity, a compression spring element is disposed in the housing behind the operating element in a housing sleeve so as to bias the operating element and together therewith the suction disc outwardly from the housing and into contact with a smooth surface when the disc mounting arrangement is disposed on such smooth surface for creating a relatively high vacuum, when, upon actuation of the operating element, the suction disc is pulled into the housing cavity.

10 Claims, 2 Drawing Sheets

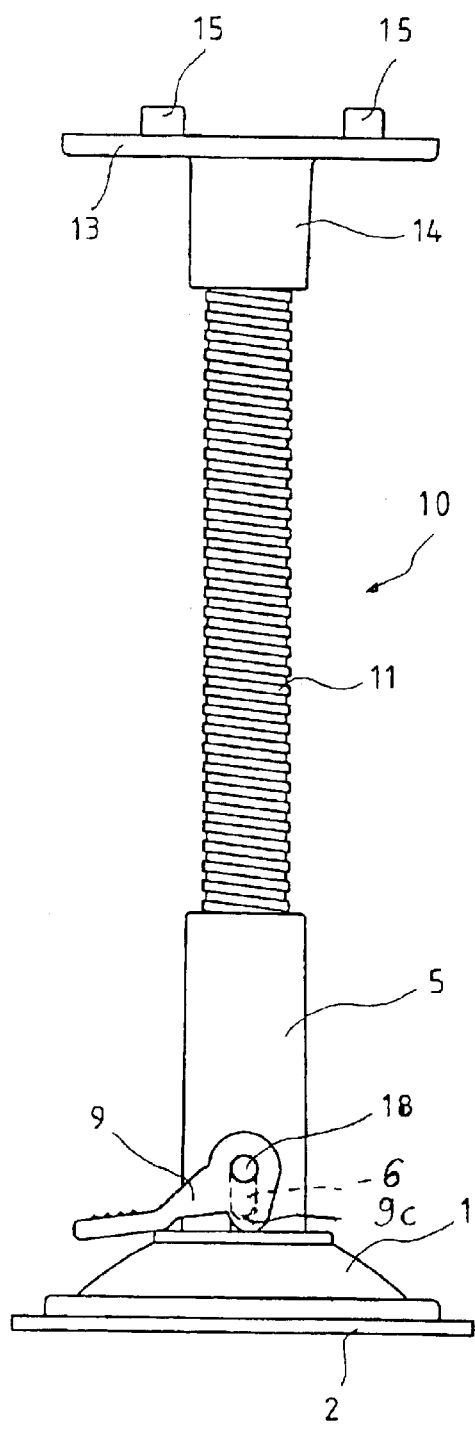
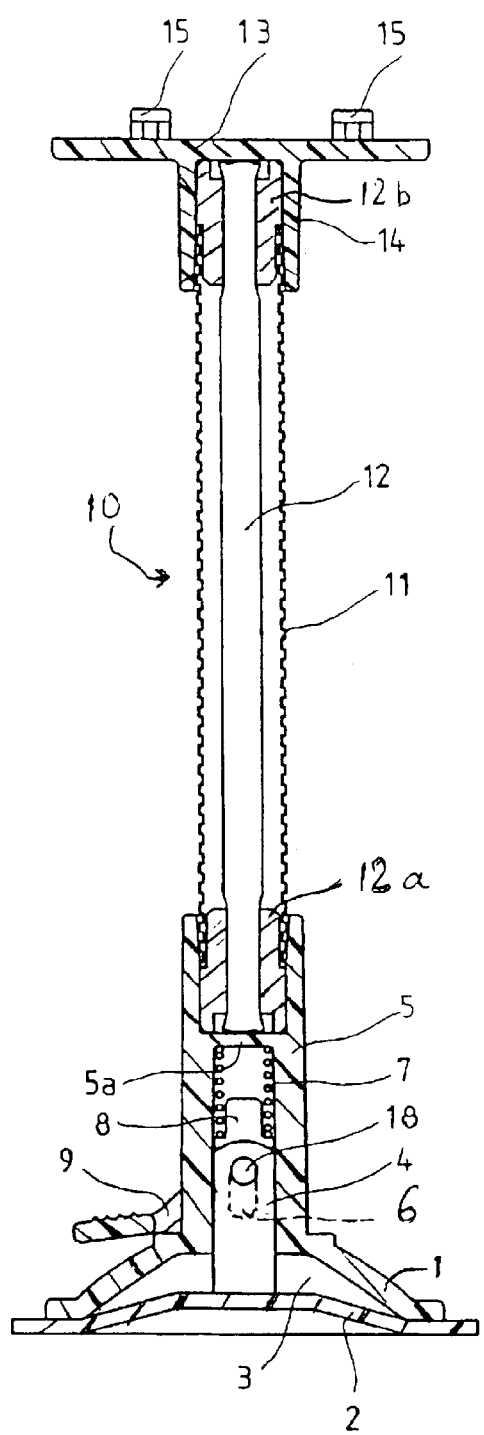
FIG 1
FIG 2

SUCTION DISC MOUNTING ARRANGEMENT

BACKGROUND OF THE INVENTION

The invention relates to a suction disc mounting arrangement for supporting articles on smooth surfaces, including a housing with an interior space which is delimited by a plate-like suction cup. The suction cup is provided with an operating element by which the suction cup can be pulled into the interior space of the housing for generating a vacuum between the suction cup and a smooth surface on which the suction cup is disposed for firmly holding the housing on the smooth surface.

Such suction disc mounting arrangements are known in the art and used for many applications for mounting articles to smooth surfaces. However, the surface must be planar and be free of dirt or dust.

It is an important advantage of such suction disc mounting arrangements, that the structures can be removed again from the smooth surface without traces so that articles can be mounted to smooth surfaces which must not be damaged.

Since the suction cup is pulled into the housing cavity, a hollow space is formed between the suction cup and the smooth surface on which it is disposed so that a vacuum is generated between the suction cup and the smooth surface by which the suction cup and, together therewith the housing is firmly attached to the smooth surface.

The vacuum generated between the suction cup and the smooth surface is greater the tighter the suction cup is dispose on the smooth surface before it is pulled into the housing of the suction disc mounting arrangement. The operating structure for the suction disc is therefore so designed that, in a rest position, the suction disc is disposed directly adjacent, that is in contact with, the smooth surface or is even pressed onto the smooth surface to which it is to be attached. However, because of manufacturing tolerances, the suction disc may not always be so arranged that it is disposed directly adjacent the smooth surface or flatly engages the smooth surface.

It is the object of the present invention to provide a suction disc mounting arrangement, which has a high suction force for supporting an article on a smooth surface and which reliably engages the smooth surface with a high vacuum force.

SUMMARY OF THE INVENTION

In a suction disc mounting arrangement for supporting objects on smooth surfaces wherein a suction disc is supported in a housing cavity in which also an operating element is movably disposed and connected to the suction disc and operating means are supported on the operating element for pulling the suction disc into the housing cavity, a compression spring element is disposed in the housing behind the operating element in a housing sleeve so as to bias the operating element and together therewith the suction disc outwardly from the housing and into contact with a smooth surface when the disc mounting arrangement is disposed on such smooth surface for creating a relatively high vacuum, when, upon actuation of the operating element, the suction disc is pulled into the housing cavity.

Since the spring providing for engagement of the suction disc with the smooth wall is disposed between the operating element and the housing cavity end wall, the suction cup can be pulled fully into the housing cavity whereby the displacement space for the suction discs is increased without an increase of the housing cavity. It is noted that there is always some air left between the suction disc and the smooth wall so that no absolute vacuum can be generated. But the greater the vacuum generated, the greater is the retaining force with which the housing is fixed to the smooth surface. And with the arrangement according to the invention, a relatively high vacuum can be generated with a relatively non-protrusive housing.

The spring element engages the operating element in the sleeve of the housing and presses the suction disc into firm engagement with the smooth surface when the housing is placed onto the smooth surface independently of the manufacturing tolerances. It is therefore made sure that the suction element is always in appropriate contact with the surface to which the housing is to be attached for generating optimal suction forces.

It is particularly advantageous if the spring element disposed in the housing sleeve is a coil spring since such a spring can easily be accommodated in the housing sleeve. There is sufficient space in the housing sleeve that the spring can be as strong as desirable. If the spring would not be accommodated in the housing sleeve the space for the spring element which then would have to be in the housing recess, would be very limited, and also the suctioning stroke of the suction element would be limited thereby. As a result, the holding force generated by the suction disc would be correspondingly smaller. With the spring element disposed in the housing sleeve as a coil spring which, permits the use of a relatively long spring, a spring with a relatively high force can be selected as the spring force may not increase excessively when compressed to the desired degree. With the relatively large spring force, the suction element is also tightly engaged with the smooth support surface, whereby, as explained earlier, a large suction force can be generated and relatively heavy articles can be supported by the suction disc mounting arrangement.

It is quite advantageous if the operating element in the housing sleeve is provided in the form of a rod on which the coil spring element is seated. Preferably, a compensation element is disposed between the coil spring and the rod to improve the force transfer from the coil spring to the operating element and the suction element. The compensation element also facilitates the mounting of the coil spring on the operating element, which is particularly advantageous upon assembly of the suction disc mounting arrangement.

In an embodiment of the invention a lifting arm provided with cam structures at opposite sides thereof is pivotally supported on the operating element for lifting the operating element and the suction element. Since, for the lifting of the operating element, an operating arm with cam structures at opposite sides of the operating element is used, the force for lifting is distributed to two levers and the lifting force is evenly distributed, the operating arm and the cam structures may be of a relatively lightweight design for accommodating the required forces. Furthermore, the lifting force on the operating element is centered so that no torque or side force acts on the operating element and canting or cogging of the operating element in its tubular guide bore is prevented. Also, the operating mechanism is highly reliable and the suction force is increased since the suction element is pulled evenly off the smooth support surface.

In a particular embodiment, a support arm is attached to the housing sleeve of the suction disc mounting arrangement which support arm comprises a flexible tube with rod disposed in the flexible tube and consisting of a material which permits bending of the support arm maintains the shape of the support arm to which it is bent. At its axial end, the rod is provided with plug-like end members on which the flexible tube is firmly supported so that the rod and the flexible sleeve form a compact unit mounted with one end on the suction disc mounting arrangement and carrying at its free end means for supporting objects. The flexible tube preferably is a corrugated plastic tube and the rod disposed in the corrugated plastic tube is preferably an aluminum rod.

The means for supporting objects preferably comprises a support plate provided with a sleeve portion, which is firmly connected to the free end of the support arm by way of the plug disposed at the end of the flexible tube and the rod. The support plate includes means for engaging various objects supported thereon.

Preferably, the engaging means are angled hook-like holding members as disclosed in applicants U.S. Pat. No. 5,740,995. Objects can then be supported on the support plate in selectable orientations. By means of the holding members objects with corresponding openings can be rapidly and reliably connected to the support plate and can be removed just as rapidly and easily.

If the object to be supported on the support plate does not have the necessary openings an adapter plate may be used which at one side has the openings for engagement with the support plate and at the opposite side is provided with elements suitable for engaging the particular object. The adapter plate may be provided for example at the opposite side with a self-adhesive surface or a hook and loop structure.

Further features and advantages of the invention will be described below on the basis of the accompanying drawings.

BRIEF DESCRIPTION OF THE DRAWINGS

FIG. 1 shows a suction disc mounting arrangement according to the invention with a flexible support arm for supporting objects connected thereto, FIG. 2 is a cross-sectional view of the arrangement shown in FIG. 1.

DESCRIPTION OF A PREFERRED EMBODIMENT

Figure 3A:
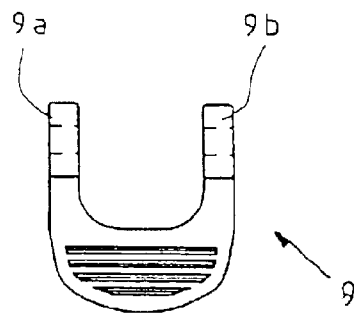
FIG. 3a shows the suction disc actuating member in a side view.
Figure 3A:
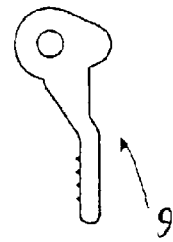
Figure 4:
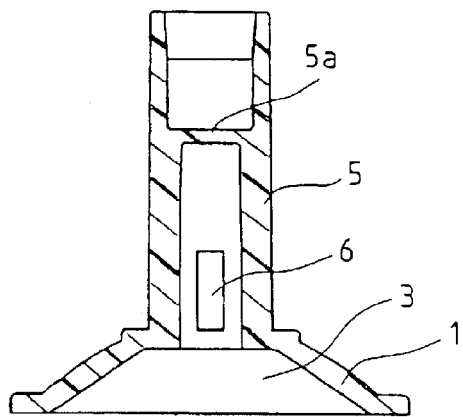
FIG. 4 shows the support plate mounted at the end of the flexible support arm.
Figure 4:
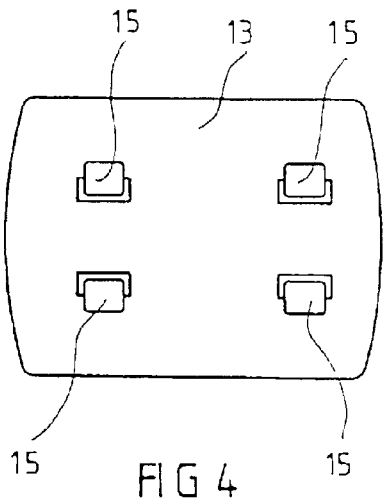
Figure 3:
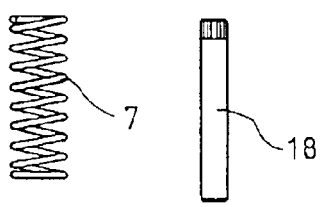
FIG. 3 is an exploded view showing the various parts of the suction disc mounting arrangement of FIGS. 1 and 2.
Figure 3:
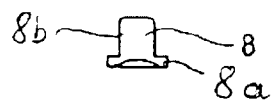
Figure 3:
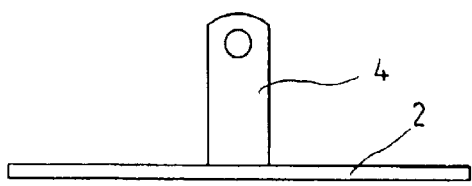

As shown particularly in FIGS. 1 and 2, the suction disc mounting arrangement according to the invention comprises a housing 1 including a cavity 3, which is delimited by a suction element or suction disc 2. Opposite the suction element 2, the housing 1 is provided with a sleeve 5 including a web 5a, which extends across the interior thereof and which divides the interior of the sleeve 5 into two separate sections.

The suction element 2 is provided with an operating element in the form of a rod 4, which extends into the adjacent section of the sleeve 5. A shaft 18 extends transversely through the rod 4 and through axial slots 6 formed in the sleeve 5 and also through actuating arms 9a and 9b of a U-shaped actuating member 9. The actuating arms 9a and 9b are provided with cams 9c which engage the housing 1 at opposite sides of the sleeve 5 so that, upon pivoting the U-shaped actuating member toward the housing 1 the shaft 18 and together therewith the rod 4 are moved into the sleeve 5 thereby pulling the suction element 2 into the housing 1 as the cams ride on the edge of the housing 1.

At its end remote from the suction element 2, the rod 4 carries a balance member 8 which, at one end, is adapted to, and seated on, the end face of the rod 4 and at its end remote from the rod 4, has a diameter which is reduced with respect to the inner diameter of the sleeve 5 so as to form a shoulder 8a. Between the balance member 8 and the web 5a, a compression coil spring 7 is disposed, which is seated on the shoulder 8a of the balance member 8 so that the smaller diameter extension 8b of the balance member 8 extends into the coil spring 7. The coil spring 7 exerts a force on the rod 4 whereby the suction element is biased outwardly out of the cavity 3 of the housing 1 if it is not fixed in a retracted position by the cams on the actuating member 9.

At the end of the sleeve 5 remote from the suction element 2, one end of a support arm 10 is mounted on the suction disc mounting arrangement and a support plate 13 is mounted to the other end of the support arm 10.

The support arm consists of a corrugated flexible plastic tube 11 through which an aluminum rod 12 extends in radially spaced relationship rod from the corrugated flexible plastic tube 11. At the opposite ends of the aluminum rod 12, annular plug members 12a and 12b are disposed on the aluminum rod 12 on which the corrugated plastic tube is supported at the given radial distance from the aluminum rod 12 and by which the aluminum rod 12 and the corrugated plastic tube 11 are fixed relative to each other.

The support plate 13 is provided with a sleeve 14 in which the other end of the support arm 10 is received and firmly connected to the support plate 13.

The support plate 13 includes angled engagement fingers 15 so that objects provided with corresponding openings can rapidly and reliably be locked to the support plate 13. The openings need to have web portions around which the engagement fingers 15 extend for engagement of the objects.

Figure 5:
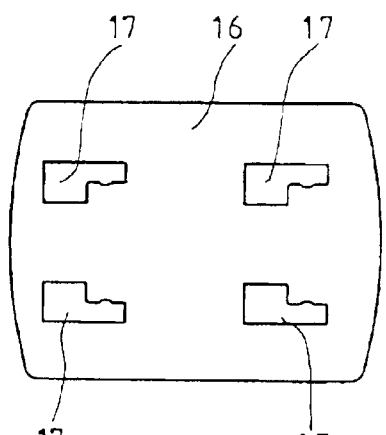
FIG. 5 shows an adapter plate for mounting onto the support plate.

If the objects are not provided with the corresponding openings an adapter plate 16 as shown in FIG. 5 may be used which has the appropriate openings 17 and which also includes other mounting means by which objects can be connected to the adapter plate 16. The mounting means may comprise, for example, a self-adhesive surface of the adapter plate 16. Instead of a self-adhesive surface, however the adapter may be provided with a hook and loop surface structure.

What is claimed is:

1. A suction disc mounting arrangement for supporting objects on smooth surfaces, comprising a housing (1) with a cavity (3), a plate-like suction disc (2) supported in said housing (1) so as to delimit said cavity (3), an operating element (4) movably supported in said housing (1) and connected to said suction disc (2), operating means (9) operatively connected to said operating element (4) for pulling said suction disc (2) into said housing cavity (3) so as to create a vacuum between said suction disc (2) and a smooth surface on which said housing (1) with said suction disc (2) is disposed for firmly retaining said housing (1) on said smooth surface, and a compression spring element (7) disposed in said housing (1) behind said operating element (4) so as to bias said operating element (4) and, together therewith, said suction disc (2) outwardly from said housing cavity (3) and into contact with a smooth surface when said suction disc mounting arrangement is disposed on such smooth surface.

2. A suction disc mounting arrangement according to claim 1, wherein said housing has a sleeve extension and said spring element is an elongated spring member received in said sleeve extension.

3. A suction disc mounting arrangement according to claim 2, wherein said operating element is a rod extending into said sleeve extension and said spring element is a coil spring engaging said rod.

4. A suction disc mounting arrangement according to claim 3, wherein a balance member is disposed between said coil spring and said operating rod.

5. A suction disc mounting arrangement according to claim 2, wherein a flexible support arm is supported in said sleeve extension remote from said suction element, said flexible support arm comprising a flexible outer tube within which a permanently bendable rod is arranged said flexible support arm being firmly connected to said sleeve extension.

6. A suction disc mounting arrangement according to claim 5, wherein said flexible tube is a corrugated plastic tube and said bendable rod is an aluminum rod.

7. A suction disc mounting arrangement according to claim 5, wherein, at its end remote from said sleeve extension, said support arm carries a support plate for supporting an object.

8. A suction disc mounting arrangement according to claim 7, wherein said support plate is provided with a sleeve portion and said support rod extends into said sleeve portion and is joined thereto.

9. A suction disc mounting arrangement according to claim 7, wherein said support plate includes angled retaining fingers for holding an object.

10. A suction disc mounting arrangement according to claim 1, wherein an operating arm is pivotally supported on said operating member and includes at opposite sides of said operating member eccentric cams which engage said housing so as to lift said operating member and pull said suction cup into said housing cavity.

* * * * *

EX PARTE REEXAMINATION CERTIFICATE (7009th)
United States Patent
Richter

(10) Number: US 6,749,160 C1
(45) Certificate Issued: Aug. 18, 2009

(54) SUCTION DISC MOUNTING ARRANGEMENT

(75) Inventor: Herbert Richter, Engelbrand (DE)

(73) Assignee: Harald Richter, Engelsbrand (DE)

Reexamination Request:
No. 90/010,368, Dec. 22, 2008

Reexamination Certificate for:
Patent No.: 6,749,160
Issued: Jun. 15, 2004
Appl. No.: 10/434,662
Filed: May 8, 2003

(30) Foreign Application Priority Data
Mar. 12, 2003 (DE) .......................................... 10311112

(51) Int. Cl.
*A45D 42/14* (2006.01)

(52) U.S. Cl. .................... 248/206.2; 248/309.3; 248/500
(58) Field of Classification Search .................. None
See application file for complete search history.

(56) References Cited

U.S. PATENT DOCUMENTS

| | | |
|---|---|---|
| 3,750,991 A | 8/1973 | Ragir |
| 4,844,395 A | 7/1989 | Perentin |
| 5,961,087 A | 10/1999 | Lee |
| 6,234,435 B1 | 5/2001 | Yeh |
| 6,478,271 B1 | 11/2002 | Mulholland |
| 6,663,064 B1 | 12/2003 | Minelli et al. |
| 7,066,434 B2 | 6/2006 | Kwok |

*Primary Examiner*—Cary E. O'Connor

(57) ABSTRACT

In a suction disc mounting arrangement for supporting objects on smooth surfaces wherein a suction disc is supported in a housing cavity in which also an operating element is movably disposed and connected to the suction disc and operating means are supported on the operating element for pulling the suction disc into the housing cavity, a compression spring element is disposed in the housing behind the operating element in a housing sleeve so as to bias the operating element and together therewith the suction disc outwardly from the housing and into contact with a smooth surface when the disc mounting arrangement is disposed on such smooth surface for creating a relatively high vacuum, when, upon actuation of the operating element, the suction disc is pulled in the housing cavity.

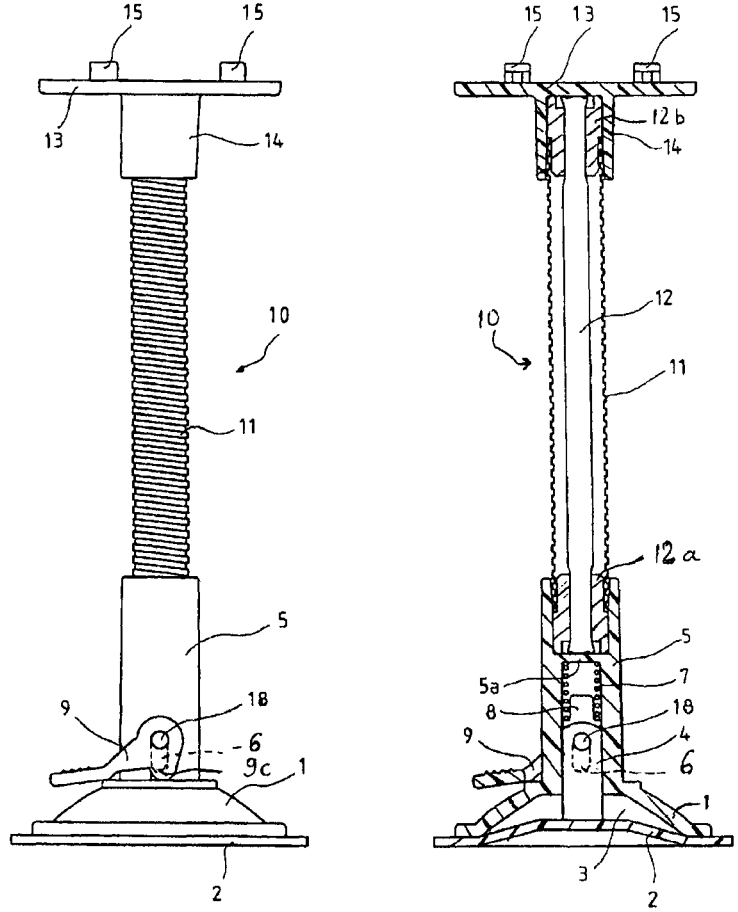

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 and 5–10 is confirmed.

Claim 4 was not reexamined.

\* \* \* \* \*